Nov. 30, 1943.                L. REAM                 2,335,532
                         OIL FILTER OR REFINER
                         Filed Feb. 6, 1941         2 Sheets-Sheet 1

Inventor
Linton Ream
By Lacey & Lacey,
Attorney

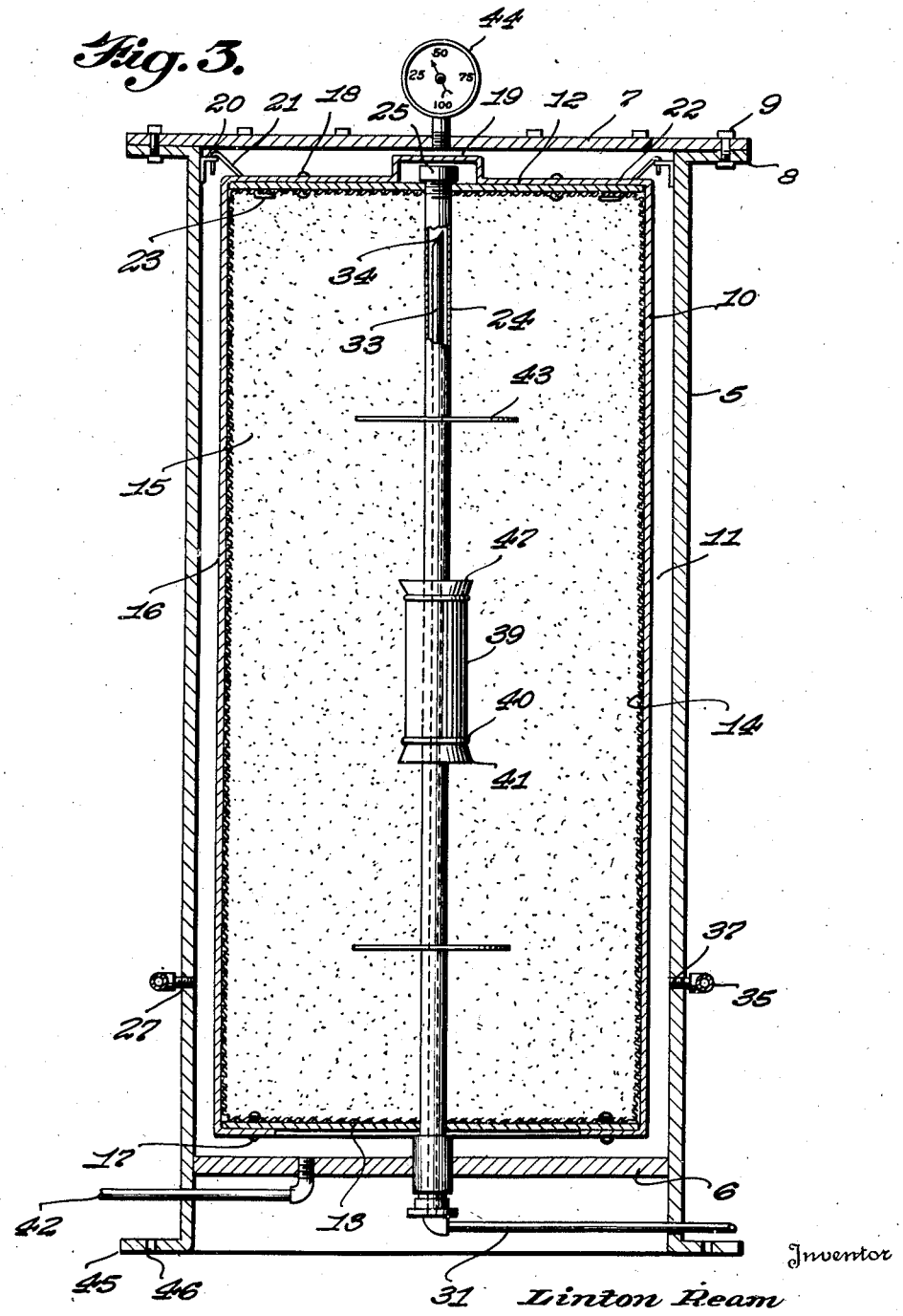

Patented Nov. 30, 1943

2,335,532

UNITED STATES PATENT OFFICE 2,335,532

OIL FILTER OR REFINER

Linton Rram, Ardmore, Okla.

Application February 6, 1941, Serial No. 377,729

3 Claims. (Cl. 210—131)

This invention relates to oil filters and more particularly to a filter especially designed for reconditioning and refining oil from the crank cases of internal combustion engines and the like to permit reuse thereof for lubricating purposes.

The object of the invention is to provide an oil filter of simple and inexpensive construction adapted to be operatively connected in the oil pressure line of an automobile, tractor, airplane or stationary engine and by means of which the lubricating oil in the crank case may be quickly and effectually filtered and returned to the engine in a purified or refined condition without shutting down the engine or in any manner interfering with the operation thereof.

A further object of the invention is to provide an oil filter or refiner including a casing adapted to receive a removable filter bag or cartridge, means being provided for feeding oil from the engine between the casing and cartridge and forcing said oil under pressure through outer and inner filtering mediums to remove all impurities therefrom, the reconditioned or refined oil being caused to flow through a central collecting pipe back to the engine.

A further object is to provide novel means for detachably securing the filtering cartridge within the casing and means for centering said cartridge with respect to the casing and preventing vibration thereof when an automobile or other vehicle in which the filter is installed is traveling over rough uneven roads.

A still further object of the invention is generally to improve this class of devices so as to increase their utility, durability and efficiency.

Figure 1:
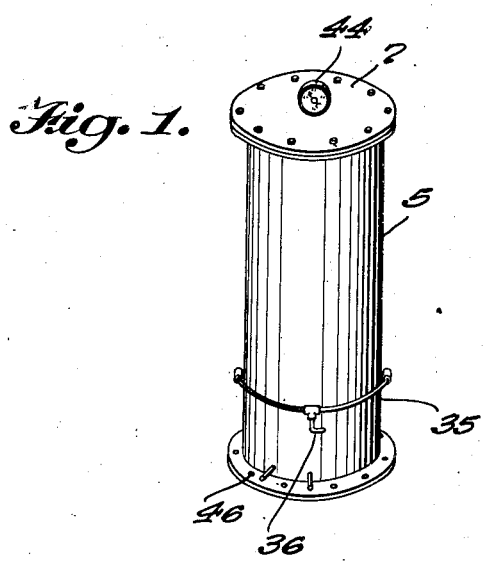
Figure 2:
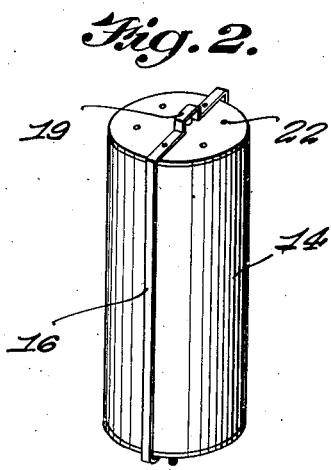
Figure 4:
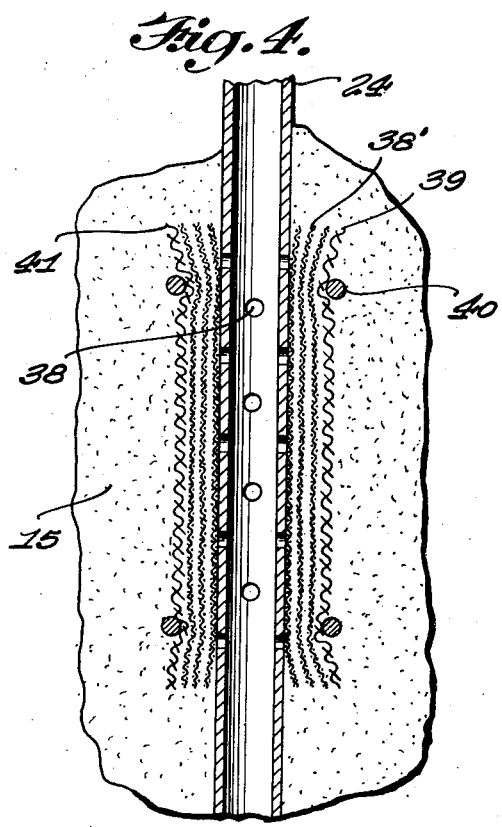
Figure 5:
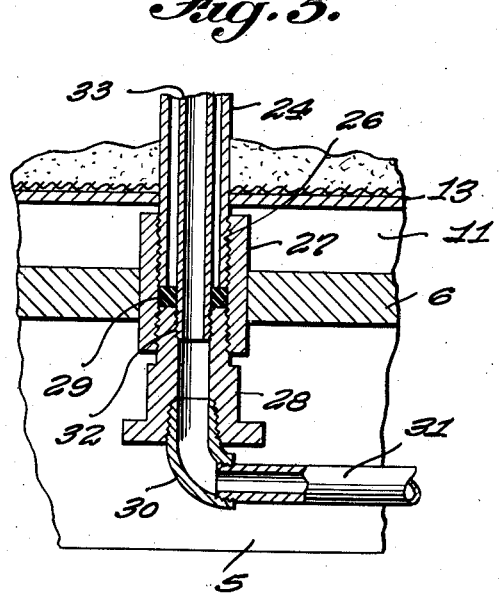

In the accompanying drawings forming a part of this specification and in which similar numerals of reference indicate corresponding parts in all the figures of the drawings:

Figure 1 is a perspective view of an oil filter or refiner embodying the present invention, Figure 2 is a similar view of the filter bag or cartridge removed from the casing, Figure 3 is an enlarged vertical sectional view, Figure 4 is an enlarged detail sectional view of the central filtering medium of the cartridge, and Figure 5 is an enlarged detail vertical sectional view of the lower coupling and its associated parts.

The improved oil filter or refiner forming the subject-matter of the present invention comprises a casing 5 preferably cylindrical in shape and having a fixed bottom 6 and a removable top or cover plate 7, said cover plate being detachably secured to lateral flanges 8 on the casing by means of bolts or similar fastening devices 9 to permit the insertion and removal of a filter bag or cartridge, indicated at 10. The filter bag or cartridge 10 is also preferably cylindrical in shape and spaced from the inner wall of the casing 5 to form an intermediate circumferential passage or compartment 11 extending the entire height of the casing.

The cartridge 10 is provided with solid top and bottom walls 12 and 13 connected by canvas or other fabric 14 which serves to confine a body of filtering material 15 preferably processed fuller's earth or similar material. The filtering bag or cartridge is reinforced and strengthened by an exterior frame 16 preferably formed of a continuous strip of strap iron, the lower ends of which are riveted at 17 to the bottom portion 13 of the cartridge and thence extended upwardly along the side walls of the canvas 14 and in contact with the top plate 12 and to which they are riveted or otherwise securely fastened, as indicated at 18. The strap iron forming the upper portion of the frame 16 is bent upwardly to form a handle 19 to facilitate positioning the cartridge within the casing or removing said cartridge therefrom.

Secured to the inner wall of the casing 5 immediately below the cover 7 thereof are brackets or keepers 20 having openings formed therein and adapted to receive the adjacent ends of suitable fastening devices preferably in the form of hooks 21. The inner ends of the hooks 21 extend through suitable openings 22 formed in the top plate 12 of the cartridge and have their terminals bent laterally at 23 beneath the plate 12 so as to prevent displacement of said hooks. These hooks 21 serve to center the cartridge within the casing and also prevent vibration of the cartridge when the device is installed on an automobile or other vehicle and the latter is traveling over rough uneven roads.

Extending centrally through the cartridge is a longitudinal tube 24, the upper end of which is closed by a cap 25 fitting beneath the handle 19 while the lower end thereof is threaded at 26 for detachable engagement with a correspondingly threaded nipple 27 welded or otherwise rigidly secured to the bottom 6 of the casing, as best shown in Figure 5 of the drawings. Threaded in the lower end of the nipple 27 is a pipe fitting 28 and interposed between the pipe fitting 28 and the adjacent end of the tubular member 24 is a gasket 29 which serves to prevent leakage of the filtered oil through the bottom of the casing.

Threaded in the lower end of the fitting 28 is an elbow 30 to which is secured an outlet pipe 31 leading to the crank case or oil pressure line of the engine. The upper end of the nipple is threaded at 32 and engaging said threads is the lower threaded end of a vertical pipe 33 which extends within the tube 24 in spaced relation to the walls thereof with its upper end open and spaced a short distance from the cap 25 of the cartridge, as indicated at 34 in Figure 3 of the drawings.

Arranged on the outside of the casing 5 is a tubular yoke 35 having a central fitting 36 communicating with the intake of the oil pump on the engine, said yoke being provided with terminal nipples 37 threaded through the walls of the casing and communicating with the compartment 11 for the purpose of feeding oil into said compartment, as will be more fully explained hereinafter.

The central portion of the tubular member 24 is provided with a series of spaced perforations 38 normally covered by strips of relatively fine mesh copper wire 38' which wire mesh strips are, in turn, covered with three or more thicknesses of wool, felt or similar material 39, the whole being retained in position on the tube 24 by means of binding wires 40 and constituting an inner filter for removing any impurities in the oil which may be left therein after it has passed through the outer filter or fuller's earth 15. The upper and lower ends of the wire mesh screen and felt constituting the inner filter is preferably flared laterally, as indicated at 41, to assist in collecting and directing the oil to said inner filter.

Extending through the bottom 6 of the casing and communicating with the compartment 11 is a drain pipe 42 to permit the removal of contaminated oil from the casing from time to time as necessary. The tube 24 is provided with annular baffle plates 43 preferably disposed above and below the inner filter, as best shown in Figure 3 of the drawings. The device is also provided with a pressure oil gage 44, the shank of which is threaded through the top 7 of the casing and communicates with the compartment 11.

The lower flange 45 of the casing 5 is preferably formed with a series of bolt-receiving openings 46 so as to permit the filter to be anchored to a suitable support.

In operation, the filter is installed under the hood of the engine of an automobile or other vehicle or in any other desired position with the central fitting 36 connected with the oil pump of the engine and with the outlet pipe 31 connected directly to the crank case of the engine or to the oil pressure line thereof. The contaminated oil from the crank case will flow through the yoke 35 and nipples 37 into the compartment 11 and will be forced under pressure through the fuller's earth 15 to the inner filter member and thence through the several layers of wire mesh material and felt or fabric constituting said inner filter and through the openings 38 into the tube 24. As the filtered oil in the tube 24 cannot escape at the bottom thereof owing to the gasket 29, said filtered oil will rise within the tube 24 until it reaches the opening 34 in the pipe 33 when it will pass downwardly within said pipe to the outlet pipe 31 and thence to the crank case or oil pressure line. In order to remove the filter bag or cartridge, it is merely necessary to remove the bolts 9 and rotate the cartridge until the threads 26 become disengaged from the nipple 27 when the cartridge may be readily withdrawn from the casing. In fitting the casing with a new cartridge, the tube 24 is positioned over the pipe 33 and lowered within the casing until the threads on the lower end of the tube engage the threads on the nipple 27 when by rotating the cartridge said cartridge will be firmly held in position with the walls thereof spaced from the casing. The hooks 21 are then engaged with their keepers 20 and the cover 7 placed in position on the top of the casing and fastened by means of the bolts 9. It will thus be seen that there is provided a comparatively simple and thoroughly efficient filter in which the waste or contaminated oil from the crank case of an internal combustion engine is first subjected to an initial filtration or purification and subsequently subjected to a further filtration to remove any particles of carbon or foreign matter not removed by the fuller's earth, the purified, reconditioned or refined oil being fed back to the crank case or oil pressure line without stopping the engine or in any manner interfering with the functions thereof.

It will, of course, be understood that the filters may be made in different sizes and shapes and constructed of any suitable material without departing from the spirit of the invention.

Having thus described the invention, what is claimed as new is:

1. A device of the class described comprising a casing, a filter cartridge disposed within the casing and spaced therefrom to form an intermediate compartment, keepers secured to the inner wall of the casing, hooks carried by the cartridge and engaging said keepers, a perforated tube extending longitudinally of the cartridge, a filtering device carried by the tube and covering the perforations therein, means for feeding oil from an internal combustion engine into the compartment, and a pipe disposed within the tube and having its upper end open and spaced from the adjacent end of said tube and its lower end operatively connected with said engine for delivering filtered oil thereto.

2. A device of the class described comprising a casing having a closed bottom and removable top, a filter cartridge disposed within the casing and spaced therefrom to form an intermediate compartment, a threaded nipple secured to the bottom of the casing, a frame extending around the cartridge and having a portion thereof bent upwardly to form an operating handle, means for feeding oil from an internal combustion engine into the compartment, a perforated tube extending longitudinally of the cartridge and having its upper end provided with a closure fitting beneath the handle and its lower end detachably engaging the threads on said nipple, a filtering element surrounding the perforations in the tube and comprising layers of wire mesh material and fabric, the opposite ends of which are flared laterally, a pipe permanently secured to the casing and extending within the tube, and an outlet pipe communicating with the first-mentioned pipe and operatively connected with said engine for delivering filtered oil thereto.

3. A device of the class described comprising a casing, a filter cartridge disposed within the casing and spaced therefrom to form an intermediate compartment, means for feeding oil from an internal combustion engine into said compartment, said cartridge being provided with a perforated head, keepers secured to the inner wall of the casing, hooks engaging the keepers and extending through the perforations in the head of the cartridge, a perforated tube extending longitudinally of the cartridge and detachably connected with the casing, a filtering device surrounding the perforations in the tube, a stationary collecting pipe extending upwardly from the bottom of the casing and having its upper end open and disposed within the perforated tube, and an outlet pipe communicating with the interior of the collecting pipe and operatively connected with said engine for delivering filtered oil thereto.

LINTON REAM.